3,225,017
MODIFIED POLYSULFIDE COMPOSITION
Irvin P. Seegman and Lester Morris, Encino, and Paul A. Mallard, Woodland Hills, Calif., assignors to Products Research Company, Burbank, Calif., a corporation of California
No Drawing. Filed Oct. 30, 1961, Ser. No. 148,757
6 Claims. (Cl. 260—79.1)

In general, the present invention relates to liquid polysulfide polymer compositions and methods of treating said compositions. More specifically, the present invention relates to one-part, stable, curable liquid polysulfide composition and method for treating same wherein initiation of curing by mixing with separate activating or curing agents immediately before deposition in place is eliminated.

Polysulfide polymers in general have been known for a number of years. See, for example, United States Patents Nos. 1,890,191; 2,049,974; 2,100,351; and 2,216,044. Likewise, liquid polysulfide polymers, although more recent, have also been known for several years. See, for example, United States Patents Nos. 2,466,963 and 2,474,859. The liquid polymers are particularly useful in a wide variety of applications because of the ease of handling a liquid material and the fact that they are capable of being vulcanized even at room temperature to a rubber-like material having the desirable physical characteristics of the cured polysulfide rubber. Such desirable characteristics are: excellent resistance to a wide range of solvents; low diffusion rate of gases; good resistance to oxidation, ozone, and weathering; adherence to metal; and a service temperature range from about −70° F. to 200° F. As a result, the liquid polymers have been extensively used as sealants in pressurization and air and gas duct applications, as protective linings in gasoline reservoirs and containers, as adhesives, and in many other useful applications.

Despite the usefulness and demonstrated practical merit of the polysulfide liquid polymers, present techniques of formulating and curing the polymers are not entirely satisfactory. Specifically, after suitable compounding of the base polymer with fillers, reinforcing pigments and the like, cure is normally initiated just prior to use by adding a separately compounded curing agent such as an oxidizing agent, e.g., lead dioxide or zinc peroxide. Since either the base polymer, or the curing agent or both normally contain moisture, the curing agent and the base polymer require extensive mixing immediately prior to use and cannot be pre-mixed. As a result, properties of the product depend to a large extent on an accurate proportioning and careful blending of the separate ingredients, often unobtainable with the equipment available in the field.

The liquid polymers preferably employed are quite viscous, resembling a syrup or thick molasses so that proper mixing is obtained only through the use of rotary beaters or other power mixers. Such equipment invariably incorporates myriads of small air bubbles into the mix, rendering the applied composition undesirably porous; during cure or later use at a high temperature, the entrapped air bubbles frequently cause ruptures or the formation of blisters in the cured film or body, thereby shortening its useful life. Moreover, heat generation due to the mixing tends to decrease the application life of the curing polymer and to vary the desirable characteristics of the product. A further practical difficulty is the necessity of separate shipping containers for the base polymer and curing agent which complicates shipping problems and facilitates mixing errors through the use of the wrong ingredient or amount of ingredient. Accordingly, the curing of liquid polysulfide polymers without the need of a separately compounded curing agent or mixing immediately prior to application would be highly desirable.

Because of these problems, there have been many attempts to develop more convenient methods of curing liquid polysulfide polymers. For example, the base polymer composition has been pre-mixed with the curing agent under anhydrous conditions and then immediately prior to use, water is added by mixing with such pre-mixed composition. See, for example, Patrick 2,466,963 and Gregory 2,787,608. Such procedure, of course, avoids the problems involved in handling the curing agent separately; however, such procedure still necessitates mixing immediately prior to application with its attendant disadvantages already noted above. In general, the pre-mixed compositions require mixing to incorporate water, additional reactants or both. Without such features, the present pre-mixed compositions have impractically long curing times and at best can only be used for thin films.

The present invention involves a one-part, stable liquid polysulfide polymer composition and method which can be completely cured without agitation immediately prior to deposition. The composition of the present invention may be deposited in place and then cured solely by contact of its surface with surroundings containing essentially only moisture. Thus, the present invention eliminates any mixing step immediately prior to use and consequently eliminates air bubbles in the cured polysulfide rubber. Also, the composition of the present invention may be packaged in a single suitable container and applied directly to the place where it is used. After deposition in place, merely by contact with atmospheric air, even thick bodies of composition may be cured without the addition of separate curing agents.

In general, an object of the present invention is a composition and method for providing one-part, stable liquid polysulfide polymers which can be cured without agitation solely by contact of its surface after deposition in place with surroundings containing essentially only moisture.

Another object of the present invention is to provide such compositions in completely pre-mixed form and suitably packaged in a single cartridge so that the composition may be directly deposited in place without the need of power mixers, stirrers or the like.

Still another object of the present invention is to provide a method whereby thick bodies of liquid polysulfide polymers may be cured and the presence of air bubbles virtually eliminated.

Other objects and advantages of the present invention will be apparent from the following disclosure of exemplary embodiments and from the specific examples and tabular data enumerated therein which enables one skilled in the art to know how to practice the invention.

In general, the present invention involes a one-part, stable, hygroscopic liquid polymer composition comprising essentially a liquid polyalkylene polysulfide polymer. The polymer has thoroughly dispersed therein a dormant curing agent for it which is activated by the presence of moisture. Likewise, the polymer has thoroughly dispersed therein a water-soluble deliquescent accelerating agent adapted to attract and absorb moisture from the surroundings and to hasten the curing of the polymer by the curing agent. The polymer may be initially dried to remove moisture or, preferably, the deliquescent accelerating agent may also be a desiccating agent to dry the polymer. Alternatively, the polymer may have thoroughly dispersed therein a single desiccating, deliquescent, dormant curing and accelerating agent which is adapted to dry the polymer, to attract and absorb moisture from the surroundings, to cure the polymer when activated by the presence of moisture and to hasten the curing of said polymer. Such surroundings may include a body of water or a body of gas containing essentially only moisture such as atmospheric air of normal humidity.

The particular polysulfide polymers involved in this invention are called "polyalkylene polysulfides" and may be represented by the general formula:

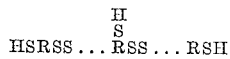

These polymers are composed essentially of the unit RSS and the molecular weight will vary with the number of these units in the molecule, and also with the specific structure of the organic radical R in the molecule. For convenience in describing these polymers, organic radical R may be defined as any polyvalent organic radical containing at least the grouping —$CH_2$— which results from the splitting off of at least two carbon-attached negative substituents from the organic compound initially containing said constituents and said splitting being done by reacting said compound with an alkali metal polysulfide. However, all of the polymers are characterized by polyfunctionality in terms of SH (mercapto) groups. For particular polymers reference may be had to the various patents cited above.

The polyalkylene polysulfide polymers which may be cured with great advantage by the materials and methods of the present invention may vary in form from thin syrupy liquids to thick viscous liquids which flow only under pressure. Their molecular weight may vary from about 200 to about 30,000 or preferably from about 500 to about 20,000. Likewise, they may have about 0.1% to 4% cross-linking. Liquid polymers in this range are viscous liquids at ordinary temperatures, have the consistency of thin syrup or molasses, and a viscosity of between about 300 and 150,000 centipoises. For instance, a preferred polymer which may be derived from dichlorodiethyl formal and trichloropropane has a molecular weight of approximately 4000. While the invention is applicable to polymers of lower or higher molecular weight, the principal advantage in semi-liquidity of starting material lies in the greater ease of handling, application and cure.

The ability of the polyalkylene polysulfide polymers to become solid elastomers or rubbery, i.e., to vulcanize or "cure" is due primarily to the reactivity of the functional SH or mercapto groups at the open ends of the polymer chains. Accordingly, curing or condensing agents, in general, which condense with or cause the union of mercapto or mercaptide groups may be used. As is well known, the most useful reaction for condensation or cure of the polysulfide liquid polymers is that of oxidation by an oxidizing agent. This reaction generally results in an increase in the length of the polymer chain by linking the sulfurs of the two mercapto end groups (thiols) to form a disulfide or sulfur-metal-sulfur linkage, with water liberated as a by-product. The present invention does not alter the basic concept of cure but, instead, provides a unique process and composition by which curing agents may be mixed or blended with polysulfide polymers and remain dormant therein until cure is desired. Among the many curing agents which may be used are organic oxidizing agents such as dinitro benzene. Likewise, inorganic oxides including: the alkali metal and alkaline metal salt peroxides such as sodium peroxide, sodium pyrophosphate peroxide, sodium carbonate peroxide and sodium perborate; the alkali earth metal peroxides such as calcium peroxide and barium peroxide; and other metal peroxides such as zinc peroxide and manganese dioxide and oxidizing agents such as ammonium dichromate may be used.

The deliquescent accelerating agent is preferably a desiccant and must be water-soluble. It has been found that alkaline materials such as alkali metal and alkaline earth metal oxides, peroxides, hydroxides and salts of weak acids have such useful characteristics. Some specific examples of such compounds which may be used are sodium oxide, sodium peroxide, potassium hydroxide, sodium hydroxide, sodium acetate, sodium carbonate, sodium phospate, sodium molybdate, calcium oxide, barium oxide, calcium peroxide, barium peroxide, calcium hydroxide, strontium hydroxide. In addition, it has been found that barium oxide is unexpectedly unusually effective as a desiccating, deliquescent accelerating agent.

It should be noted that the alkali metal and alkaline earth metal peroxides, such as sodium peroxide, calcium peroxide and barium peroxide may be used as single desiccating, deliquescent, curing and accelerating agents.

The amount of curing agent and desiccating, deliquescent accelerating agent mixed with the polyalklene polysulfide polymer may vary substantially due to the inactive state of the curing agent when the composition is kept in dry surroundings. However, it is desirable that the curing agent be present in at least a stoichiometric amount so as to be sufficient to provide a satisfactory rate of cure and complete vulcanization. Likewise, it is preferable that the desiccating, deliquescent accelerating agent be present in sufficient amount to keep the polymer dry during storage without maintaining such dryness for an unduly long time period after the composition has been deposited in place. For example, where a polyalkylene polysulfide has a molecular weight of about 4000, the amount of curing agent used would be about 2 to 20 parts per 100 parts of polyalkylene polysulfide and the amount of desiccating, deliquescent accelerating agent used would be about 0.5 to 50 parts per 100 parts of polyalkylene polysulfide.

The physical and chemical properties of the cured composition of the present invention can be varied to produce a product best suited to the methods of application and the specific use to which it is to be subjected. The degree of cross-linking and the average molecular weight of the polyalkylene polysulfide polymer influences the physical properties. For example, a liquid polymer having a lower average molecular weight, e.g., below 3000, will produce harder bodies than a liquid polymer having a higher average molecular weight, the latter having a lower Shore hardness but better tear resistance. Likewise, the addition of and increase in the amount of fillers, pigments and reinforcing agents such as calcium carbonate, iron oxide, aluminum powder, silicon dioxide, clays, zinc sulfide, carbon black, rayon floc, titanium dioxide, etc., will in general increase the Shore hardness, toughness and tensile strength and decrease elongation of the product.

The adhesiveness of the cured composition to metals, glass, resin-coated objects, etc., may be greatly increased without destruction of other properties by the addition of various resinous or plastic compositions generally in the range of 1 to 20 parts per 100 parts of the polymer although as high as 50 parts can be used. Primarily due to their outstanding properties of resistance to heat, water and to chemicals, the phenolic and epoxy resins are the preferred resins for this purpose for use with the compositions of the present invention.

Other additives to the composition of the present invention include plasticizers. Plasticizers increase the fluidity of the composition and improve the dispersion of the solids. Likewise, plasticizers improve elongation and reduce the hardness of the cured composition. Among the common plasticizers which may be used are chlorinated diphenyl compositions.

In general, the liquid polyalkylene polysulfiide polymers are treated in the present invention by first intimately mixing the polymer with the dormant curing agent which is activated by the presence of moisture and the desiccating, deliquescent accelerating agent which is adapted to dry the polymer, to attract and absorb moisture from the surroundings of the mixture and to hasten the curing of the polymer. More particularly, the polymer is usually first mixed with fillers, plasticizers, etc., by power stirring and then paint milling. The stability of the polymer mixture and resulting composition can be improved by drying by exposure to a vacuum to remove moisture. The air bubbles normally encountered in mixing are eliminated by either paint milling or vacuum degassing of the mixture. When the dispersion is complete, the mixture is maintained in dry surroundings during shipment, and storage, by packaging in an air-tight container. The mixture is used by depositing it in place and contacting it with moisture-containing surroundings to cure it. Such moisture-containing surroundings can be simply normal atmospheric air or a body of water. If desired, the curing of the mixture may be quickened by heating it. It should be noted that while the present invention is primarily concerned with the absorption of moisture to achieve curing, it is possible that other solvents such as ammonia or the highly polar organic solvents may be used.

The following specific examples will serve to illustrate the invention and to make clear the manner in which it may be practiced.

*Example 1*

To 100 parts by weight of polyalkylene polysulfide having a molecular weight of about 4000, a viscosity of about 40,000 centipoises and 0.5% cross-linking, i.e., Thiokol LP-32, are added the following components in the proportions by weight indicated:

| | |
|---|---|
| Thiokol LP-32 | 100 |
| Titanium dioxide | 18 |
| Calcium carbonate | 45 |
| Plasticizer[1] | 15 |
| Adhesive resin[2] | 5 |
| Calcium peroxide (60%) | 10 |
| Barium oxide | 10 |

[1] 47 parts of Arochlor 1254, a chlorinated diphenyl produced by Hercules Powder Co. and 10 parts of HB-40, a hydrogenated terphenyl by Monsanto Chemical Co.
[2] 80% solution of Epon 1001, an epoxy resin, in methyl ethyl ketone produced by Shell Chemical Co.

All ingredients were thoroughly mixed in a paint mill and the resulting formulation was loaded into sealed cartridges suitable for use in a standard extrusion gun. At intervals, as desired, some of the cartridges extruded onto test panels. The material cured into tough rubber-like compositions which, when tested, showed physical and chemical properties at least equivalent to similar compositions cured in the usual manner by mixing.

*Properties*

| | |
|---|---|
| Stability at 120° F. | 30 days. |
| Stability at 75° F. | 6 months. |
| Tack-free time | 24 hours. |
| Cure time at 75° F. and 50% relative humidity | 30 days for ¼″ thickness. |
| Cure time at 120° F. and 100% relative humidity | 2 days for ¼″ thickness. |

Adhesion (After immersion 5 days in water; MIL-S-7502 Peel Test):

| | (lbs./in.²) |
|---|---|
| Aluminum Alloy 6061 | 35 |
| Glass | 30 |
| Stainless steel | 35 |
| Galvanized steel | 32 |

*Examples II–V*

Some examples of other compositions in parts by weight which may be used are as follows:

| | II | III | IV | V |
|---|---|---|---|---|
| Thiokol LP-32 | 100 | 100 | 100 | 100 |
| Titanium Dioxide | 20 | 20 | 20 | 20 |
| Calcium Carbonate | 40 | 40 | 40 | 40 |
| Plasticizer (1) | 10 | 10 | 10 | 10 |
| Adhesive Resin (2) | 5 | 5 | 5 | 5 |
| Zinc Peroxide (4) | 10 | 10 | | |
| Plasticizer (3) (4) | 10 | 10 | | |
| Calcium Peroxide (4) | | | 3 | 10 |
| Plasticizer (1) (4) | | | 6 | 20 |
| Sodium pyrophosphate Peroxide (4) | | | 2 | 0.5 |
| Plasticizer (5) | | | 2 | 0.5 |
| Barium Oxide | | 10 | 10 | 10 |
| Plasticizer (5) (4) | | 10 | 3 | 10 |
| Toluene | | | 3 | |
| Sodium Hydroxide | 0.5 | 0.25 | | |
| Plasticizer (5) (4) | 1 | 0.5 | | |
| Toluene | 0.5 | 0.25 | | |
| Toluene (6) | 3.75 | 3.75 | 3.75 | 3.75 |

(1) Arochlor 1254.
(2) 80% solution of Epon 1001 in methyl ethyl ketone.
(3) Arochlor 1242.
(4) Dispersion.
(5) HB-40.
(6) Dispersion prepared with 10 parts of the Thiokol LP-32.

From the foregoing detailed description, it can be seen that one feature of the present invention is the formation of a one-part, stable polysulfide composition by incorporation of an alkaline desiccating accelerating agent. Such result is unexpected since it is well known in the art that alkaline materials normally accelerate the cure of the polysulfide polymer rather than stabilize it. Thus, by utilization of a desiccating accelerating agent, the present invention achieves not only the known increased rate of cure when curing is desired, but also a stable composition when curing is not desired.

Another feature of the present invention is the utilization of a deliquescent accelerating agent. Such agent attracts and absorbs moisture from the surroundings such as atmospheric air so that moisture is dispersed throughout the polysulfide composition and the dormant curing agent is activated. Consequently, the step of mechanically mixing water into the polysulfide composition containing a curing agent becomes unnecessary and can be eliminated for the first time.

Because of these features, the present invention provides for the first time a one-part, stable hygroscopic polysulfide composition which can be prepackaged such as in cartridges for extrusion guns and then directly deposited in place without any further mixing. After deposition, even thick bodies of the polysulfide compositions are cured solely by contact with moisture-containing surroundings such as atmospheric air of normal humidity. Thus, neither additional mixing nor reactants are required to cure the polysulfide composition of the present invention.

It will be understood that the foregoing description and examples are only illustrative of the present invention, and it is not intended that the invention be limited thereto. Many other specific embodiments of the present invention will be obvious to one skilled in the art in view of this disclosure. All substitutions, alterations, and modifications of the present invention which comes within the scope of the following claims or to which the present invention is readily susceptible without departing from the spirit and scope of this disclosure are considered part of the present invention.

We claim:

1. A stable unitary liquid polymer composition protected from moisture and capable of being shipped and stored in a single container and later being deposited in place without agitation or intermixing with other material for complete curing by contact of its surface with surroundings containing essential only moisture, said composition comprising essentially (a) a liquid polyalkylene polysulfide polymer having thoroughly dispersed therein, (b) a dormant curing agent in an amount sufficient to cure said polymer which is activated by the presence of moisture, and (c) an alkaline desiccating deliquescent accelerating agent adapted and sufficient to maintain said polymer in dry condition during shipment and storage and to attract and absorb moisture from its surroundings after deposition in place to hasten the curing of said polymer by said curing agent, wherein (b) and (c) are different substances and said accelerating agent is water-soluble and composed of at least one number of the group consisting of the alkali metal and alkaline earth metal oxides, peroxides, hydroxides and salts of weak acids.

2. A composition as set forth in claim 1 wherein said surroundinps are atmospheric air.

3. A composition as set forth in claim 1 wherein said deliquescent apent is barium oxide.

4. A composition as set forth in claim 1 wherein said deliquescent agent is calcium oxide.

5. A composition as set forth in claim 1 wherein said deliquescent agent is sodium oxide.

6. A stable, unitary liquid polymer composition protected from moisture and capable of being shipped and stored in a single container and later being deposited in place without agitation or intermixing with other material for complete curing solely by contact of its surface with moisture-containing surroundings, said composition comprising essentially (a) a liquid polyalkylene polysulfide polymer having thoroughly dispersed therein, (b) an alkaline desiccating, deliquescent, dormant curing and accelerating agent adapted and sufficient to dry said polymer, to attract and absorb said moisture from said surroundings, to cure said polymer when activated by the presence of moisture and to hasten the curing of said polymer, said curing and accelerating agent being water-soluble and composed of at least one member of the group consisting of the alkali metal and alkaline earth metal peroxides.

References Cited by the Examiner
UNITED STATES PATENTS

| | | | |
|---|---|---|---|
| 2,216,044 | 9/1940 | Patrick | 260—79.1 |
| 2,288,410 | 6/1942 | Lippman | 252—186 |
| 2,466,963 | 4/1949 | Patrick et al. | 260—79.1 |
| 2,584,264 | 2/1952 | Foulks | 260—79.1 |
| 2,940,958 | 6/1960 | Smith | 260—79.1 |

OTHER REFERENCES

Apukhtina et al.: 1957 Kauchuki Rezina 16, No. 6, pp. 7–11 (Reported in 52 CA 15111).

Hackh's Chem. Dictionary (Copyright) 1944 (p. 99, "barium peroxide," p. 158, "calcium peroxide").

Jorczak et al.: "Polysulfide Liquid Polymers" 43, Ind. and Eng. Chem., pp. 325–328, February, 1951.

Morton: Introduction to Rubber Technology, pp. 222–225, Reinhold Copyright 1959.

LEON J. BERCOVITZ, *Primary Examiner.*

JOSEPH R. LIBERMAN, *Examiner.*

Notice of Adverse Decision in Interference

In Interference No. 95,894, involving Patent No. 3,225,017, I. P. Seegman, L. Morris and P. A. Mallard, MODIFIED POLYSULFIDE COMPOSITION, final judgment adverse to the patentees was rendered July 17, 1974, as to claims 1, 2 and 3.

[*Official Gazette December 24, 1974.*]